United States Patent [19]

Fulkerson

[11] Patent Number: 4,630,927
[45] Date of Patent: Dec. 23, 1986

[54] OPTICAL PROJECTOR

[75] Inventor: Emmet M. Fulkerson, Cincinnati, Ohio

[73] Assignee: General Electric Company, Cincinnati, Ohio

[21] Appl. No.: 466,741

[22] Filed: Feb. 15, 1983

[51] Int. Cl.$^4$ .................................. G01B 11/14
[52] U.S. Cl. ............................. 356/372; 356/375
[58] Field of Search ............ 356/1, 373, 375, 376

[56] References Cited

U.S. PATENT DOCUMENTS

| | | | |
|---|---|---|---|
| 3,667,846 | 6/1972 | Nater et al. | 356/120 |
| 4,074,104 | 2/1978 | Fulkerson | 219/121 LM |
| 4,204,772 | 5/1980 | Balasubramanian | 356/1 |
| 4,326,804 | 4/1982 | Mossey | 356/375 |

FOREIGN PATENT DOCUMENTS

| | | | |
|---|---|---|---|
| 94871 | 1/1970 | France | |
| 0038159 | 3/1979 | Japan | 356/1 |
| 56-89005 | 7/1981 | Japan | |

OTHER PUBLICATIONS

IBM Technical Disclosure Bulletin, vol. 15, No. 2, Jul. 1972, pp. 504, 505, "Optical Surface Microtopography Measurement and/or Automatic Focussing," A Frosch/M Kallmeyer/H Korth/F Schedewie.

Primary Examiner—R. A. Rosenberger
Assistant Examiner—Crystal D. Cooper
Attorney, Agent, or Firm—Gregory A. Welte; Derek P. Lawrence

[57] ABSTRACT

An invention is disclosed for optically determining the position of an object in space, using a single lens for triangulation, wherein an indexing light beam is projected to a lens on one side nonparallel to the optical axis of the lens. The lens focuses the indexing light beam at a known point on the other side of the lens at or near which reflection occurs by the object. Reflected light is captured by the lens and focused toward a photodetector which generates a signal indicating whether reflection occurred at the known point, thus indicating whether the object is present at the known point. If laser light is used, provision is made for, in effect, positioning the laser light source on the optical axis to reduce the effects of laser pointing instabilities. The invention can be used to measure the radii of rotating gas turbine engine rotors.

6 Claims, 6 Drawing Figures

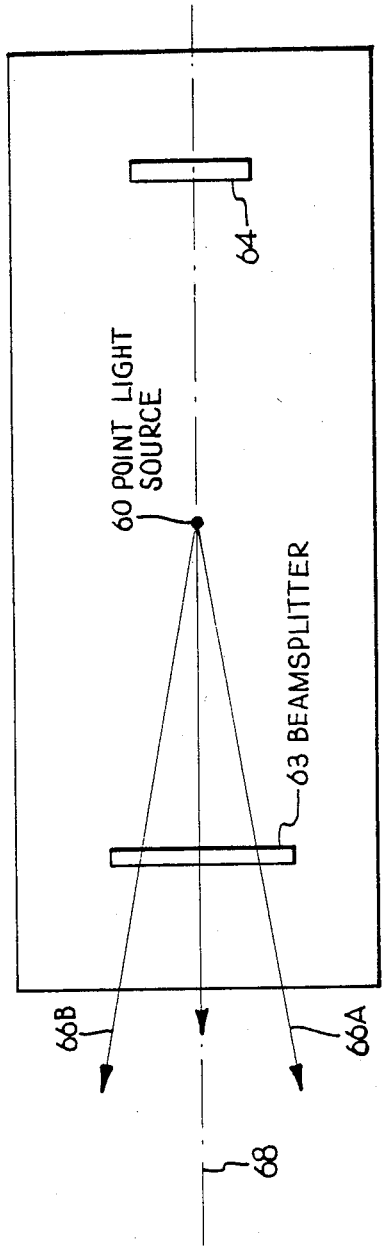
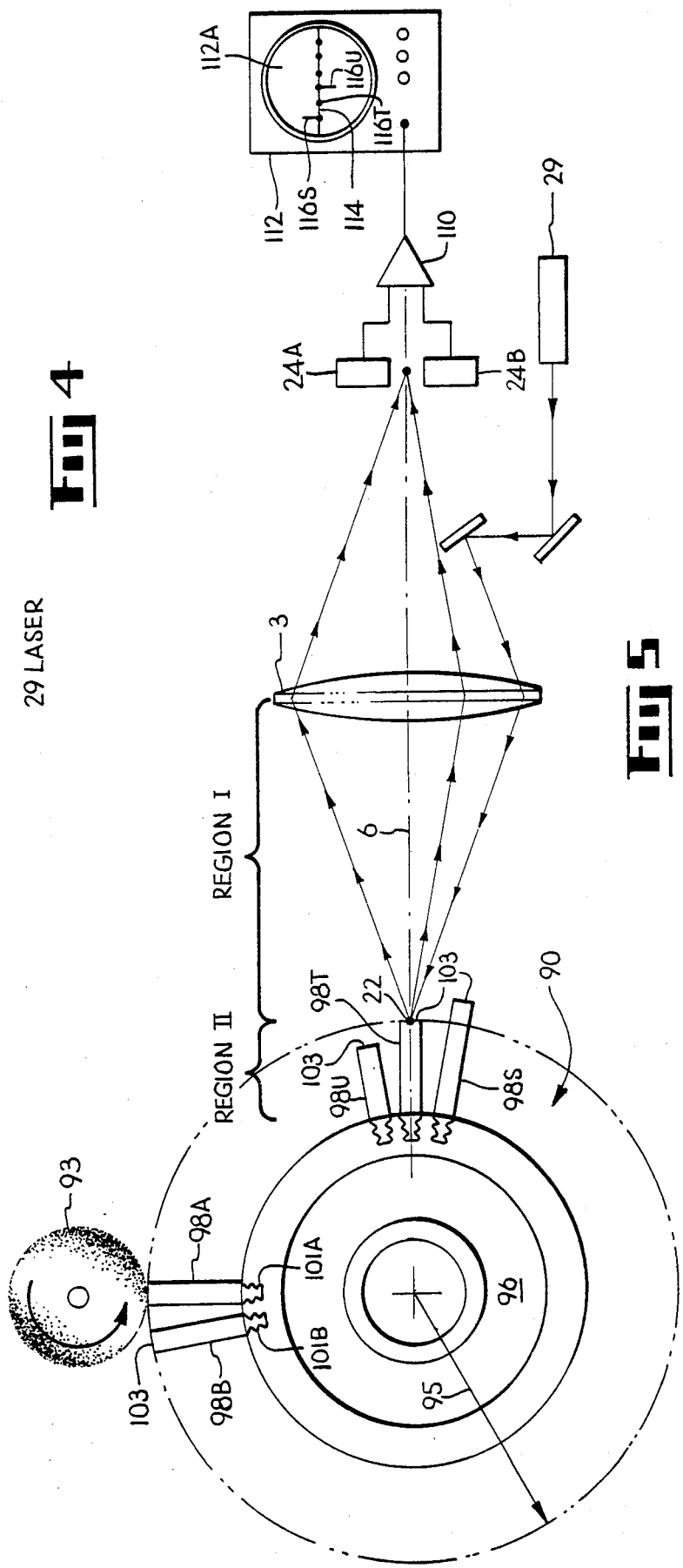

OPTICAL PROJECTOR

The present invention relates to optical projectors and, more particularly, to such projectors which project light beams to an object and determine the position of the object by sensing a characteristic of reflected light and which, in addition, function to reduce the effects of pointing instabilities in the source of the light when laser light is used.

BACKGROUND OF THE INVENTION

Optical triangulation is commonly used to determine the position in space of a point on an object. One type of optical triangulation system commonly utilizes two-lens systems: a projection lens system to project a light beam to the object and a receiving lens system to receive reflected light. Information derived from the position of the received light is used to determine the position of the object.

Other types of optical systems project light to the object and determine the position of the object by sensing the degree of focus of reflected light after being processed by a lens system.

In general, these two types of optical projection systems are complex. Further, when these systems utilize laser light, the systems are subject to the influence of a characteristic inherent in many laser light sources, namely, pointing instability. Pointing instability refers to the sporadic and unpredictable angular deviation of the laser light beam from its idealized path.

OBJECTS OF THE INVENTION

It is an object of the present invention to provide a new and improved optical projector.

It is a further object of the present invention to provide a new and improved optical projector which utilizes optical triangulation techniques, yet employs a single lens for both projecting a light beam to an object and for receiving light reflected by the object.

It is a further object of the present invention to provide a new and improved optical projector which senses the presence of an object at a predetermined point in space.

It is a further object of the present invention to provide a new and improved optical projector which projects light toward an object and produces a signal in response as to whether the point at which the light is reflected by the object is located at a particular focal point of the lens.

It is a further object of the present invention to provide a new and improved optical projector which reduces the effects of pointing instability in lasers.

SUMMARY OF THE INVENTION

In one form of the invention, a light beam is projected to a first side of a lens nonparallel to the optical axis of the lens. The lens focuses the light beam to an object located at a point on a second side of the lens. Light reflected at this second point (as opposed to a nearby point) will be focused by the lens back to a photodetector. Means connected to the photodetector generates a signal indicating whether the light was reflected at the second point, and thus whether the object is located at the second point.

BRIEF DESCRIPTION OF THE DRAWINGS

FIG. 4 is a schematic illustration of a laser.

FIG. 6 illustrates a second form of the present invention.

DETAILED DESCRIPTION OF THE INVENTION

Figure 1:
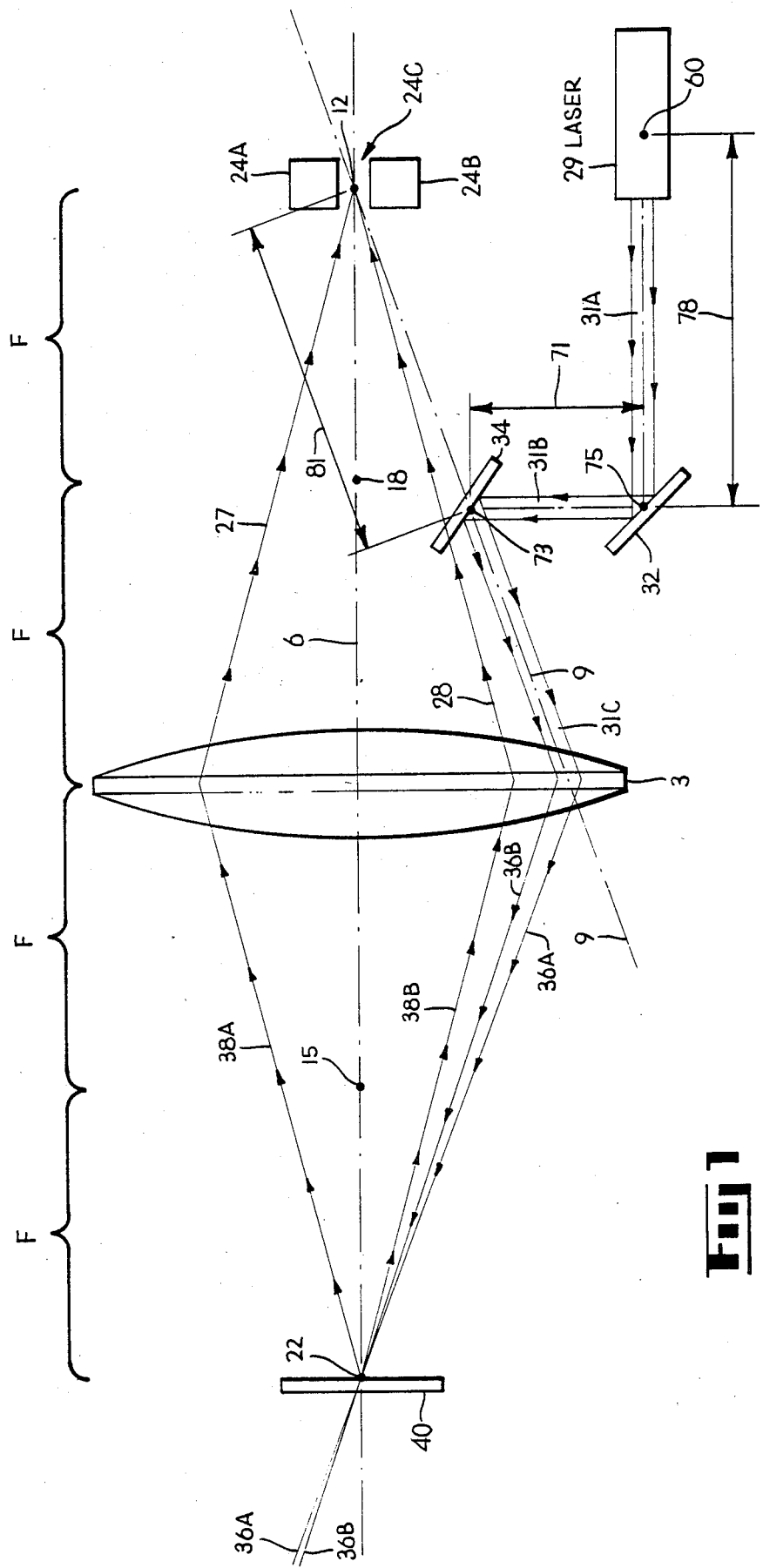
FIG. 1 illustrates one form of the present invention.

One form of the invention is depicted in FIG. 1, wherein a symmetrical double convex lens 3 is shown having an optical axis 6. A second type of axis is significant in this discussion, namely an axis such as axis 9 which extends from the lens 3 and intersects the optical axis 6 at a point 12 which in the embodiment herein described is located two focal lengths (2F) from the lens 3. The axis 9 is herein termed a projection axis and it defines a first path followed by the laser beams later described. Principal focal points 15 and 18 are located on the optical axis 6 at distances marked F on opposite sides of the lens e. There also exist points, herein termed double focal points 12 and 22, located on the optical axis 6 and each positioned twice as far from the lens 3 as the focal points 15 and 18. That is, the four distances F are equal.

A bi-cell or dual element photosensor comprising a pair of first and second photodetectors 24A and 24B having a space 24C between them is positioned such that a first of the double focal points 12 is contained within the space 24C. Thus, light which is focused at the first double focal point 12, such as rays 27 and 28, will illuminate both photodetectors 24A and 24B. The rays 27 and 28 are said to illuminate both photodetectors despite the fact that these rays are shown as intersecting at a discrete point between the photodetectors 24A-B for the following reason: it is well known that the cross section of a laser beam is a distribution of varying light intensity having a theoretically infinite width, but rapidly diminishing in intensity beyond some boundaries such as the boundaries indicated by rays 27 and 28. Thus, the photodetectors 24A and 24B each receive some illumination even though FIG. 1 does not show the light contained between rays 27 and 28 as striking these photodetectors. The unique combination of zero difference in the output signals (the zero difference being a null signal) from both photodetectors 24A-B, together with a finite signal produced by each, indicates the fact that the light rays 24A-B are focused at the first double focal point 12. The occurrence of this unique combination can be ascertained by an observer examining the signals or by known electronic circuitry.

A light source, such as a laser 29, projects a light beam 31A toward a first reflection means such as a first mirror 32 which reflects a laser beam 31B to a second reflection means such as a mirror 34 which reflects an indexing beam 31C along the projection axis 9. The indexing beam 31C is preferably centered upon the projection axis 9. Because the projection axis 9 crosses the optical axis 6 and intersects the first double focal point 12 and because the indexing beam 31C follows the projection axis 9, the indexing beam 31C is focused by the lens 3 to a point located two focal lengths along the optical axis on the other side of the lens 3, namely, to the second double focal point 22. That is, because of the general properties of lenses such as the double convex lens 3, all light rays entering the lens 3 which pass through, or emanate from, the first double focal point 12 will be focused to the second double focal point 22, as illustrated by rays 36A-B. Any light rays not passing through, nor emanating from, the first double focal point 12 will not be focused to the second double focal point 22.

Further, because of the reciprocity characteristics of lenses, light rays entering the lens 3 from the second double focal point 22, such as rays 38A-B which are reflected by an object 40, will similarly be focused back to the first double focal point 12 as rays 27 and 28. To repeat, light rays passing through (or, equivalently, emanating from) one of the double focal points 12 or 22 will be focused to the other, reciprocal, double focal point. Since the indexing beam 31C travels as though it emanated from the first double focal point 12, the indexing beam 31C will be focused to the second double focal point 22.

If an object 40 is present exactly at the second double focal point 22, light reflected as rays 38A-B emanating from the second double focal point 22 will be collected by the lens 3 and focused as rays 27 and 28 to the photodetectors 24A-B located at the first double focal point 12. The null signal produced by the photodetectors 24A-B indicates that the light rays 38A-B were reflected at the second double focal point 22 and, by inference, that the object 40 is positioned there.

Figure 2:
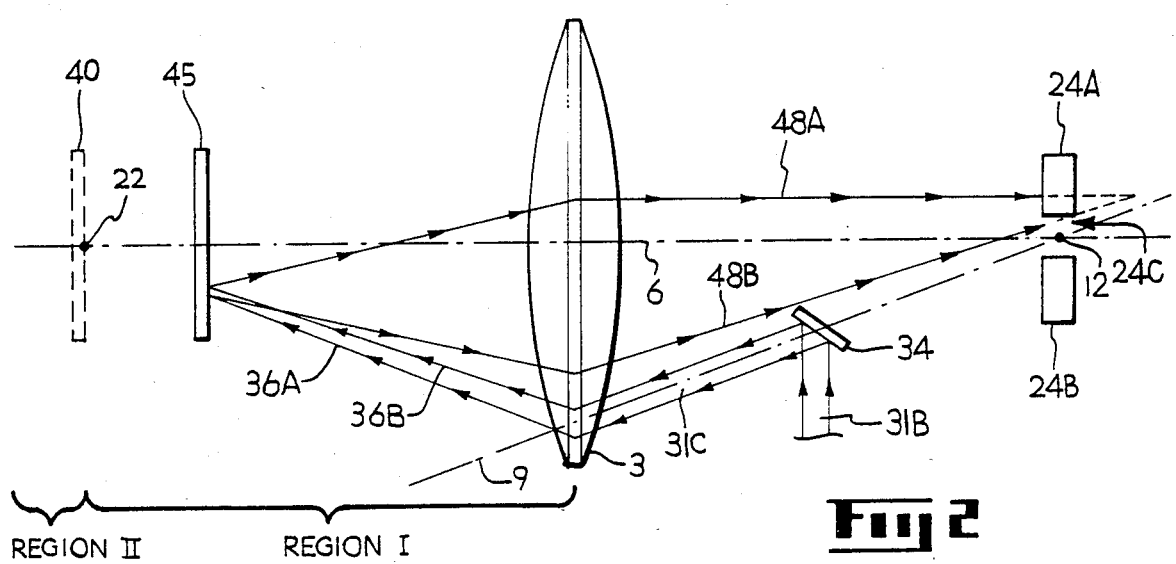
FIGS. 2 and 3 illustrate the invention in FIG. 1 receiving light rays reflected by two differently positioned objects.
Figure 3:
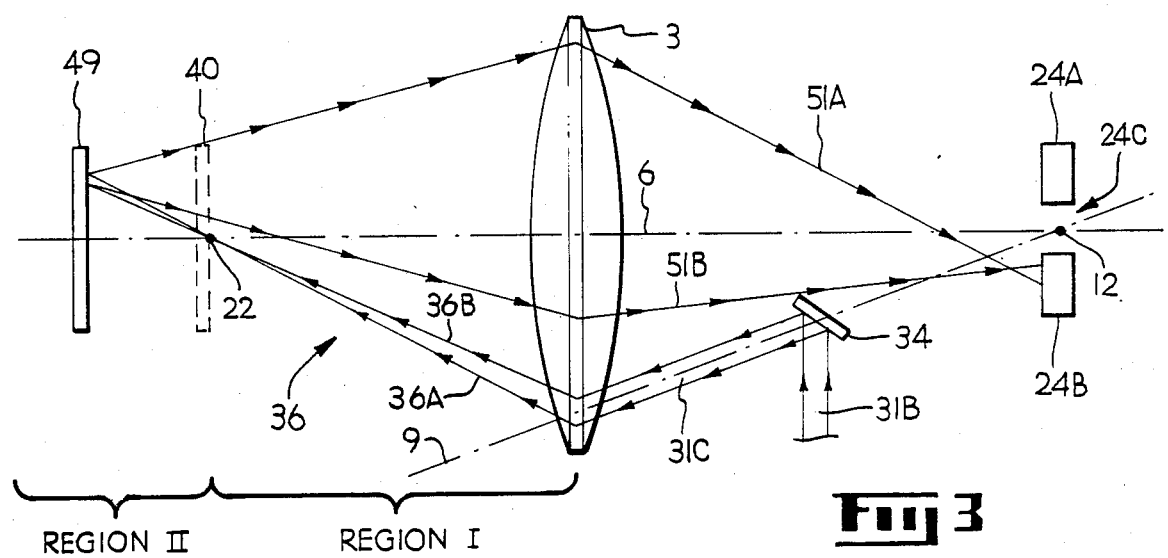

If reflection by the object occurs at a point other than the second double focal point 22, the reflected light will not be focused precisely at the first double focal point 12. In particular, as shown in FIG. 2, light reflected by an object 45 which is nearer to the lens 3 than the second double focal point 22 will be focused by the lens 3 as rays 48A-B which predominantly illuminate the first photodetector 24A. Conversely, as shown in FIG. 3, light reflected from an object 49 which is farther from the lens than the second double focal point 22 will be focused as rays such as 41A-B which predominantly illuminate the second photodetector 24B. Thus, the signals produced by the photodetectors 24A-B indicate whether reflection by the object 40 occurs at the second double focal point 22 and, if not, whether the reflection occurs at a point nearer to (inside) or farther from (outside) the lens 3 than the second double focal point 22.

It is to be noted that one reason for whether photodetector 24A or B in FIGS. 2 and 3 is respectively illuminated by an object inside or outside the secound double focal point 22 is the fact that the indexing beam bounded by rays 36A and 36B does not travel exactly along the optical axis 6, but travels off axis. That is, the projection axis 9 is nonparallel to the optical axis 6 and strikes the lens 3 off-center (the optical axis 6 strikes the lens 3 on-center). As a consequence, the indexing beam 36 is located on the bottom side of the optical axis 6 in the inner region (Region I) and on the top side of the optical axis 6 in the outer region (Region II). Whether reflection by the object occurs in Region I and below the optical axis 6, or in Region II and above the optical axis 6, is ascertained by the photodetectors 24A-B through the reflected light received by them.

The reduction of the effects of laser pointing instabilities will now be discussed. The laser 29 in FIG. 1 can be viewed, as shown in FIG. 4, as a point source 60 of light contained between two boundaries, which can be mirrors or beamsplitters 63 and 64. The point source 60 projects a laser beam 66 through beamsplitter 63 and along, but not necessarily coincident with, a laser axis 68. That is, the laser beam 66 can randomly rotate about the point source 60 and thereby follow paths 66A-B. The lack of constant coincidence with the laser axis 68 is termed pointing instability.

The rotational effects of the pointing instabilities can be reduced by positioning the laser 29 in FIG. 1 such that the sum of distance 71, namely the distance between the points of reflection 73 and 75 on mirrors 34 and 32, together with distance 78, namely the distance between the point light source 60 and the point of reflection 75 on mirror 32, equals the distance 81, namely the distance between the first double focal point 12 and the point of reflection 73 on the second mirror 34. Positioning the laser 29 as described has the effect of positioning the point source 60, which is the center of rotation of the projected beam 66, at a virtual origin, namely, at the first double focal point 12. Accordingly, pointing instabilities have the effect of rotating the indexing light beam 31C about this virtual origin, and this rotation does not alter the focus of light beam 36 to the second double focal point 22: the indexing light beam, in effect, emanates from the first double focal point irrespective of rotation. Therefore, the effect of pointing instabilities in the laser 29 are theoretically eliminated and, in practice, substantially reduced.

Figure 5:
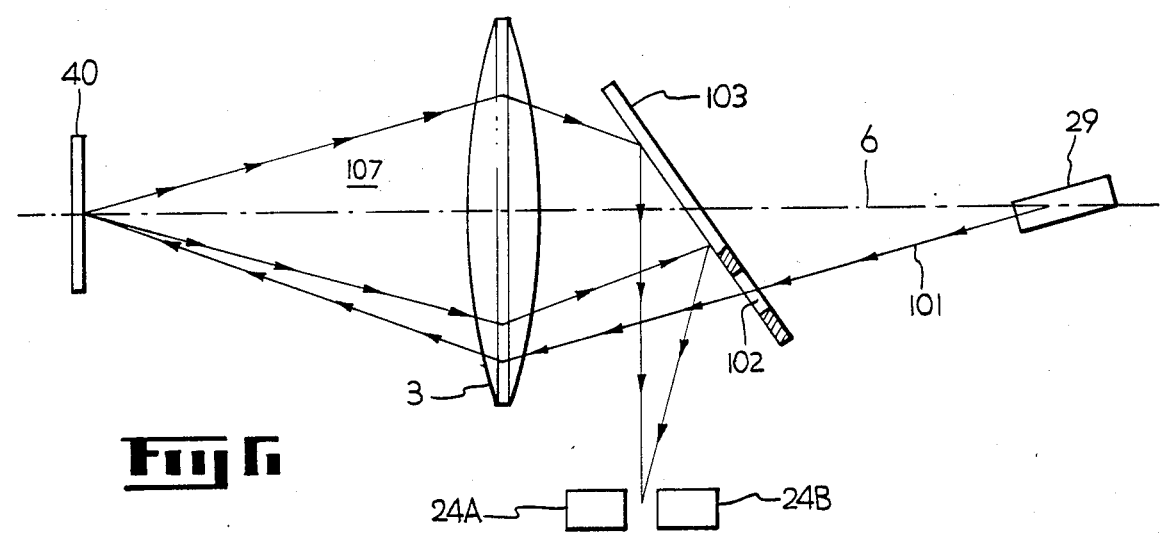
FIG. 5 illustrates the form of the present invention shown in FIG. 1 utilized to measure the radius of a turbine engine rotor.

The projector described above can be used to measure the diameter of a rotating workpiece while the workpiece is being machined. As shown in FIG. 5, a rotating workpiece 90 is being ground by a grinder 93 to a desired radius 95. The workpiece 90 can comprise a rotor 96 of a gas turbine engine and can support turbine blades such as blades 98A-Y (not all shown) which are loosely mounted in slots such as slots 101A-Y when the rotor 96 is at rest. During operation, the rotor 96 spins and centrifugal force forces the blades 98A-Y in radially outward directions. When operating speeds of 5,000-10,000 rpm are reached, the centrifugal force becomes sufficiently great that the blades 98A-Y are firmly locked into position in their respective slots 101A-Y.

Given that the rotor 96 as well as the blades 98A-Y change in dimension under centrifugal loading, it is desired to measure the actual radius 95 from the tip 103 of each blade to the center 105 of the rotor so that the grinder 93 can grind all the blade radii to a precise and uniform dimension. To measure the radius of each blade tip 103 during spinning, the optical projector described above is utilized as follows. The lens 3 is positioned so that its optical axis 6 is aligned radially with the rotor 96 and the second double focaal point 22 is located near the tips 103 of the spinning blades. When a blade tip such as the tip 103 of blade 98T exactly crosses the second focal point, the photodetectors 24A-B indicate that occurrence. When a blade tip 103 of blade 98S enters Region I, or a blade tip 103 of blade 98U enters Region II, the photodetectors 24A-B accordingly indicate, in the manner described above in connection with FIGS. 1-3.

During high speed operation, the photodetectors 24A-B are connected through a differential amplifier system 110 to an oscilloscope 112 and the oscilloscope trace 114 is triggered by means known in the art each time a blade 98 crosses the optical axis 6. Given that the rotor 96 carries 25 blades 98A-Y (not all shown), the oscilloscope 112 will display information at 25 locations (not all shown) on its screen 112A such as points 116S-U corresponding to the positions of the rotor tips 103 of blades 98S-U with respect to the second focal point 22. For example, point 116S on trace 114 corresponds to tip 103 of blade 98S and so on. Tip 103 of blade 98T produces no voltage signal on the trace 114 since that tip exactly crosses the second double focal point 22. However, tip 103 of blade 98S in entering Region I produces a positive voltage spike 116S. Tip 103 of blade 98U in entering Region II produces a negative spike 116U. The oscilloscope trace 114 repeats itself for each revolution of the turbine rotor 96.

The length of a particular blade can be determined by moving the lens 3 until the voltage spike corresponding to the blade of interest disappears. At such time, the tip 103 thereof is known to be crossing the second focal point 22. Thus, the actual positions of the tips 103, and thus the length of each blade 98A–Y, can be determined one-at-a-time under the actual rotational speeds of the gas turbine rotor 96. Further discussion of this turbine blade measurement is contained in U.S. Pat. No. 4,074,104, issued to Emmet M. Fulkerson on Feb. 14, 1978, which is hereby incorporated by reference.

An optical projection system has been described wherein an indexing light beam is projected to a lens so that the indexing light beam originates, in effect, at a virtual origin located at a first double focal point on the optical axis and located two focal lengths away from the lens. Thus, rotation of the indexing light beam about the first double focal point has substantially no effect on the focus of the indexing light beam to a reciprocal, second double focal point located on the other side of the lens. An object positioned nearby the reciprocal focal point reflects light which is then captured by the lens.

Depending upon the relative position of the object with respect to the reciprocal focal point, the light captured by the lens is focused differently to a photodetection means. The photodetection means discriminates among the different types of reflection and generates signals indicating the relative position of the point of reflection with respect to the reciprocal focal point. The optical projector can be used to determine the positions of a high speed sequence of objects passing near the reciprocal focal point such as the tips of turbine blades in a rapidly rotating rotor of a gas turbine engine. One significant aspect of the present invention is the optical detection of the position of an object without collimation of the light beams (except, of course, the light received directly from the laser 29, which is itself highly collimated.) That is, the light projected by the lens 3 as the indexing beam bounded by rays 36A and 36B, the reflected light bounded by rays 38A and 38B, and the light focused toward the photodetectors 24A and 24B and bounded by rays 27 and 28, are all noncollimated types of light.

Numerous modifications and substitutions may be undertaken without departing from the true spirit and scope of the present invention. In particular, it is known that the projection axis 9 can intersect the optical axis 6 at points other than the first double focal point 12 and the principles of the present invention can still be used. That is, the first double focal point need not be located exactly two focal lengths away from the lens. However, the conditions of the following equation are preferably to be satisfied:

$$A = (B \times F)/(B - F)$$

wherein:
A = the distance from the lens 3 in FIG. 1 to the second double focal point 22,
B = the distance from the lens 3 to the first double focal point 12, and
F = the focal length of the lens 3.

In addition, it is recognized that the position of the photodetectors 24A–B and of the laser 29 could be exchanged as shown in FIG. 6. In such a case, the laser beam 101 would originate from the first focal point 12, pass through a hole 102 in a mirror 103 to reach the lens 3. Light reflected by the object 40 and captured by the lens 3 would be focused as light beam 107 toward the mirror 103 and thence reflected to the photodetectors 24A–B.

Further, the present invention can be utilized in conjunction with invention described in the patent application, entitled "Light Beam Stabilizer," by Emmet M. Fulkerson and Truman F. Kellie, filed Feb. 15, 1983, Ser. No. 466,758. Both of these applications are hereby incorporated by reference.

What is desired to be secured by Letters Patent of the United States is the following:

I claim:

1. An optical projector, comprising:
   (a) a laser, which is subject to pointing instability, for projecting a light beam along a first path, the light beam appearing as a virtual point source;
   (b) a lens having a center, a first and a second side, and an optical axis for
      (i) receiving the light beam on a first side and off-center,
      (ii) focusing the light beam toward an object located on a second side of the lens,
      (iii) receiving light reflected by the object, and
      (iv) focusing the light received in (iii) to a point on the first side of the lens;
   (c) a photosensor positioned near the point of (b)(iv) for
      (i) receiving the focused light of (b)(iv) and
      (ii) producing a predetermined signal when the reflection of (b)(iii) occurs at a predetermined point; and
   (d) means interposed in the first path of (a) for
      (i) receiving the light beam of (a),
      (ii) transmitting the light beam toward the lens along a second path which is nonparallel to the optical axis, and
      (iii) imparting to the light beam characteristics of a light beam projected from the virtual point source positioned in the photosensor, for reducing the effects of the pointing instability.

2. Optical projector according to claim 1 in which the photosensor of (c) and the predetermined point of (c)(ii) are each located two focal lengths from the lens and are each on the optical axis.

3. A method of optical inspection of an object utilizing a lens means having an optical axis and a focal length, comprising the steps of:
   (a) projecting from a laser appearing as a virtual point source, an indexing light beam, along a path which is nonparallel to the optical axis to the lens means for focusing the light beam by the lens means toward the object for reflection, the path being positioned to, in effect, intersect the optical axis at a point which is two focal lengths away from the lens means, and
   (b) utilizing the lens means to focus light reflected by the object to a focus detector in which the virtual point source appears.

4. A method of optical inspection of an object utilizing a lens means having an optical axis and a focal length, comprising the steps of:
   (a) projecting a laser beam, that appears as a virtual point source, to one side of the lens means along a path which effectively intersects the optical axis at a point which is two focal lengths away from the lens;
   (b) utilizing the lens means to focus the laser beam to an object located on the other side of the lens means for reflection by the object;
   (c) utilizing the lens means to focus light reflected by the object to a sensor, where the virtual point source appears, which generates a first signal when the light reflected by the object is reflected from a point on the optical axis which is located two focal lengths away from the lens means.

5. A method according to claim 4 and further comprising the steps of generating a second signal when the object is nearer to the lens means than the point of (c) and a third signal when the object is farther from the lens means than the point of (c).

6. A method according to claim 4 in which the object is the tip of one of a plurality of gas tubine rotor blades and further comprising the steps of:
   (d) rotating the blades about a center;
   (e) aligning the optical axis of the lens means in a generally radial direction;
   (f) producing the first, second, and third signals in response to reflection by the tip of each rotating blade.

* * * * *